(12) United States Patent
Guan et al.

(10) Patent No.: US 9,280,872 B2
(45) Date of Patent: *Mar. 8, 2016

(54) PROGRESSIVE JACKPOT ALERTS IN A GAMING SYSTEM

(71) Applicant: Bally Gaming, Inc., Las Vegas, NV (US)

(72) Inventors: Wei Guan, Las Vegas, NV (US); Brett McReynolds, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,269

(22) Filed: May 22, 2015

(65) Prior Publication Data

US 2015/0254935 A1    Sep. 10, 2015

Related U.S. Application Data

(63) Continuation of application No. 14/185,715, filed on Feb. 20, 2014, now Pat. No. 9,039,522, which is a continuation of application No. 13/171,316, filed on Jun. 28, 2011, now Pat. No. 8,684,831.

(60) Provisional application No. 61/360,415, filed on Jun. 30, 2010.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)
*G06Q 30/02* (2012.01)
*G06Q 50/34* (2012.01)
*A63F 13/355* (2014.01)
*A63F 13/61* (2014.01)

(52) U.S. Cl.
CPC .......... *G07F 17/3258* (2013.01); *A63F 13/355* (2014.09); *A63F 13/61* (2014.09); *G06Q 30/0207* (2013.01); *G06Q 50/34* (2013.01); *G07F 17/323* (2013.01); *G07F 17/3272* (2013.01); *G07F 17/3286* (2013.01)

(58) Field of Classification Search
USPC ........... 463/9, 20, 25, 26, 27, 29, 42; 273/292
See application file for complete search history.

(56) References Cited

U.S. PATENT DOCUMENTS

| | | |
|---|---|---|
| 2003/0181231 A1 | 9/2003 | Vancura et al. |
| 2004/0038735 A1 | 2/2004 | Steil et al. |
| 2004/0254012 A1 | 12/2004 | D'Amico et al. |

(Continued)

FOREIGN PATENT DOCUMENTS

| | | |
|---|---|---|
| JP | 2009-254897 A | 11/2009 |
| JP | 2010-131285 A | 6/2010 |

*Primary Examiner* — Adetokunbo O Torimiro
(74) *Attorney, Agent, or Firm* — Brooke W. Quist; Marvin A. Hein; Philip J. Anderson

(57) ABSTRACT

Various embodiments are directed to a gaming system capable of providing progressive level alerts or promotions when a progressive jackpot reaches a predetermined value. In one embodiment, the user is able to register for a progressive level alert. In another embodiment, the progressive level alert is presented on an affiliated or third party website. By providing progressive jackpot amount information, the user, who may not otherwise patronize a casino, is encouraged to visit the particular casino offering games capable of awarding a progressive jackpot prize of a predetermined amount.

14 Claims, 12 Drawing Sheets

(56) References Cited

U.S. PATENT DOCUMENTS

| | | |
|---|---|---|
| 2005/0037837 A1* | 2/2005 | Rowe .............................. 463/25 |
| 2007/0215433 A1 | 9/2007 | Logan et al. |
| 2008/0288500 A1 | 11/2008 | Sapounas |
| 2011/0014972 A1* | 1/2011 | Herrmann et al. .............. 463/25 |
| 2012/0101952 A1 | 4/2012 | Raleigh et al. |

* cited by examiner

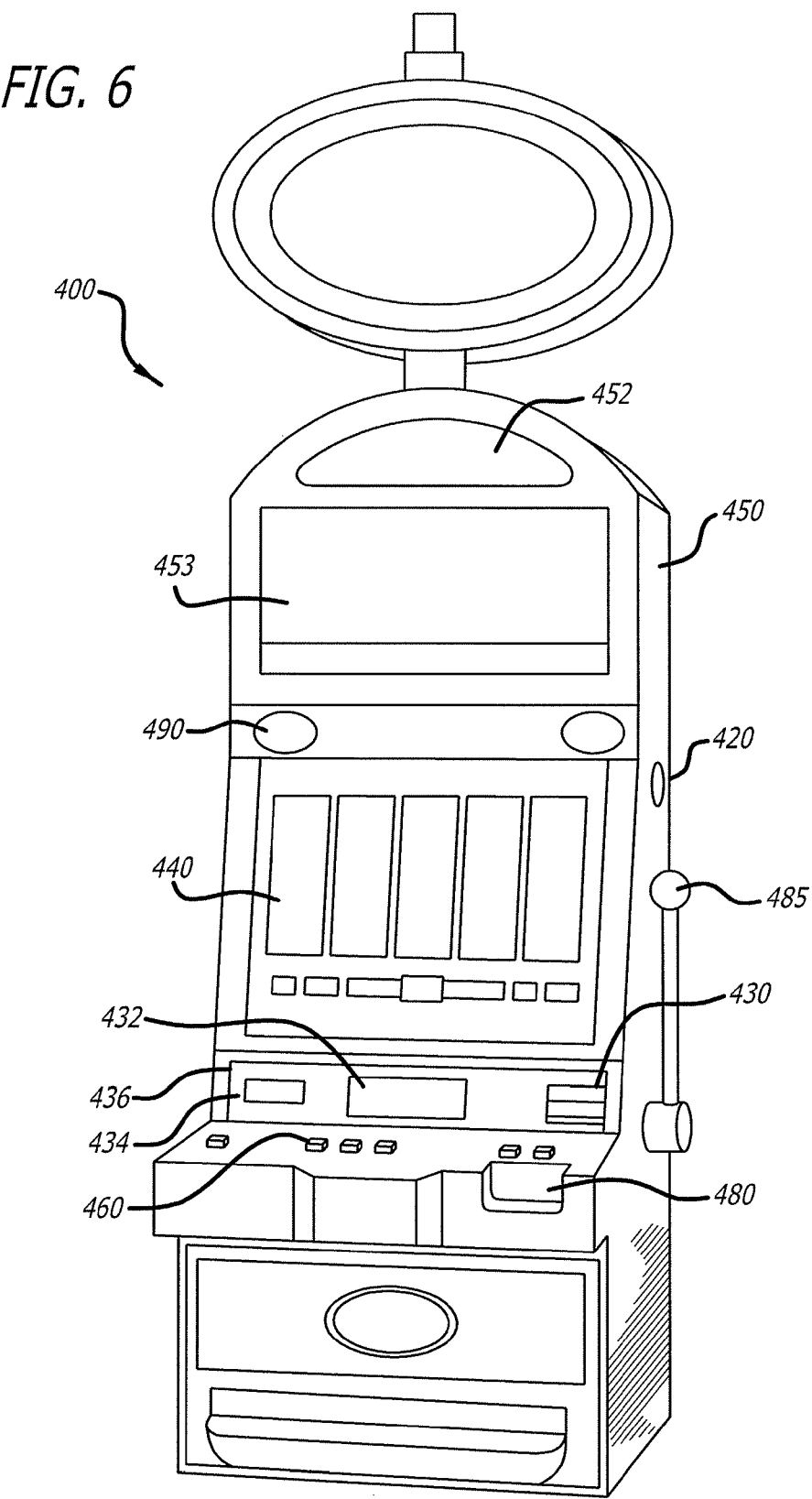

PROGRESSIVE JACKPOT ALERTS IN A GAMING SYSTEM

CROSS-REFERENCE TO RELATED APPLICATION

This application is a continuation of U.S. patent application Ser. No. 14/185,715 filed Feb. 20, 2014, which is a continuation of U.S. patent application Ser. No. 13/171,316 filed Jun. 28, 2011, now U.S. Pat. No. 8,684,831 issued Apr. 1, 2014, which is a Non-Provisional application of Provisional Application No. 61/360,415, filed Jun. 30, 2010, each of which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description relates to progressive gaming systems.

BACKGROUND

Many gaming machines have a specific payout table that associates fixed payout amounts (in coins or credits) with specific combinations. By contrast, a progressive gaming machine is a machine having at least one possible payout that increases over time based on one or more factors and is awarded when a certain combination is achieved on the gaming machine. Such a payout is referred to as a "progressive payout". One example of a factor that can increase the progressive payout is the number of all coins deposited in the gaming machine ("coin in"). The progressive payout may then be some percentage of coin in. Sometimes progressive gaming machines are located in a bank of machines with all machines in the bank playing for the progressive payout. In such cases, the first machine in the bank to achieve the associated winning combination wins the progressive payout. Often, the current value of the progressive jackpot is displayed on a display above the machine. The value of the progressive jackpot is kept in a running counter referred to as a "meter."

In other cases, certain progressive gaming machines may be located anywhere in a gaming establishment and not physically adjacent to each other. In other cases, the progressive gaming machines may be part of a progressive gaming system located in different gaming establishments across a state or other region. Such systems are referred to as "area progressive gaming systems". The progressive payout in such area progressive gaming systems may be tied to the coin in of all of the machines in the system, regardless of where they are physically located in a gaming establishment, state, or region.

SUMMARY

Briefly, and in general terms, various embodiments are directed to a gaming system capable of providing progressive level alerts or promotions when a progressive jackpot reaches a predetermined value. In one embodiment, the user is able to register for a progressive level alert. In another embodiment, the progressive level alert is presented on an affiliated or third party website. By providing progressive jackpot amount information, the user, who may not otherwise patronize a casino, is encouraged to visit the particular casino offering games capable of awarding a progressive jackpot prize of a predetermined amount.

In one embodiment, a progressive gaming system includes a progressive server for managing a progressive jackpot for a plurality of gaming devices networked with the progressive server. The progressive gaming system also includes a data warehouse coupled to the progressive gaming system, wherein the data warehouse contains jackpot amount data and jackpot location data. A notification server communicates with the data warehouse, wherein the notification server issues a progressive level alert to at least one patron when the progressive jackpot reaches a predetermined amount.

In addition to gaming systems, various methods for issuing a progressive level alert are disclosed herein. The method includes storing progressive jackpot amounts and the locations of the progressive jackpots from one or more progressive gaming systems in a data warehouse; receiving patron data from a casino club desk or a web portal, wherein the patron data includes patron contact information and a threshold progressive jackpot amount for triggering a progressive jackpot alert; and issuing a communication from a notification server to the patron when a progressive jackpot satisfies the threshold progressive jackpot amount selected by the patron.

In another method, progressive jackpot alerts are sent to affiliated or third party websites. The method includes storing progressive jackpot amounts and the locations of the progressive jackpots from one or more progressive gaming systems in a data warehouse; generating one or more progressive alerts by the notification server for an affiliated or third party website based on jackpot amounts stored in the data warehouse; and transmitting the one or more progressive alerts to an affiliated or third party website for presentation on the affiliated or third party website.

Other features and advantages will become apparent from the following detailed description, taken in conjunction with the accompanying drawings, which illustrate by way of example, the features of the various embodiments.

BRIEF DESCRIPTION OF THE DRAWINGS

FIG. 6 is a perspective view of one embodiment of a gaming machine in accordance with one or more embodiments.

DETAILED DESCRIPTION

Various embodiments are directed to a gaming system that provides alerts when a particular progressive jackpot level is reached. In one embodiment, a registered user may request to be notified that a particular progressive jackpot level is reached. By way of example, but not of limitation, the user may receive an email or text message that a progressive jackpot has reached a value of $10,000,000. In another embodiment, the notification of a particular progressive jackpot amount is presented on a travel website, such as but not limited to, Expedia or Travelocity, in order to entice a person visiting such website to book a trip to the particular casino having games associated with the progressive jackpot. By providing progressive jackpot amount information, the user, who may not otherwise patronize a casino, is encouraged to visit the particular casino offering games capable of awarding a progressive jackpot prize of at least the amount contained in the notice or advertisement.

Figure 1:
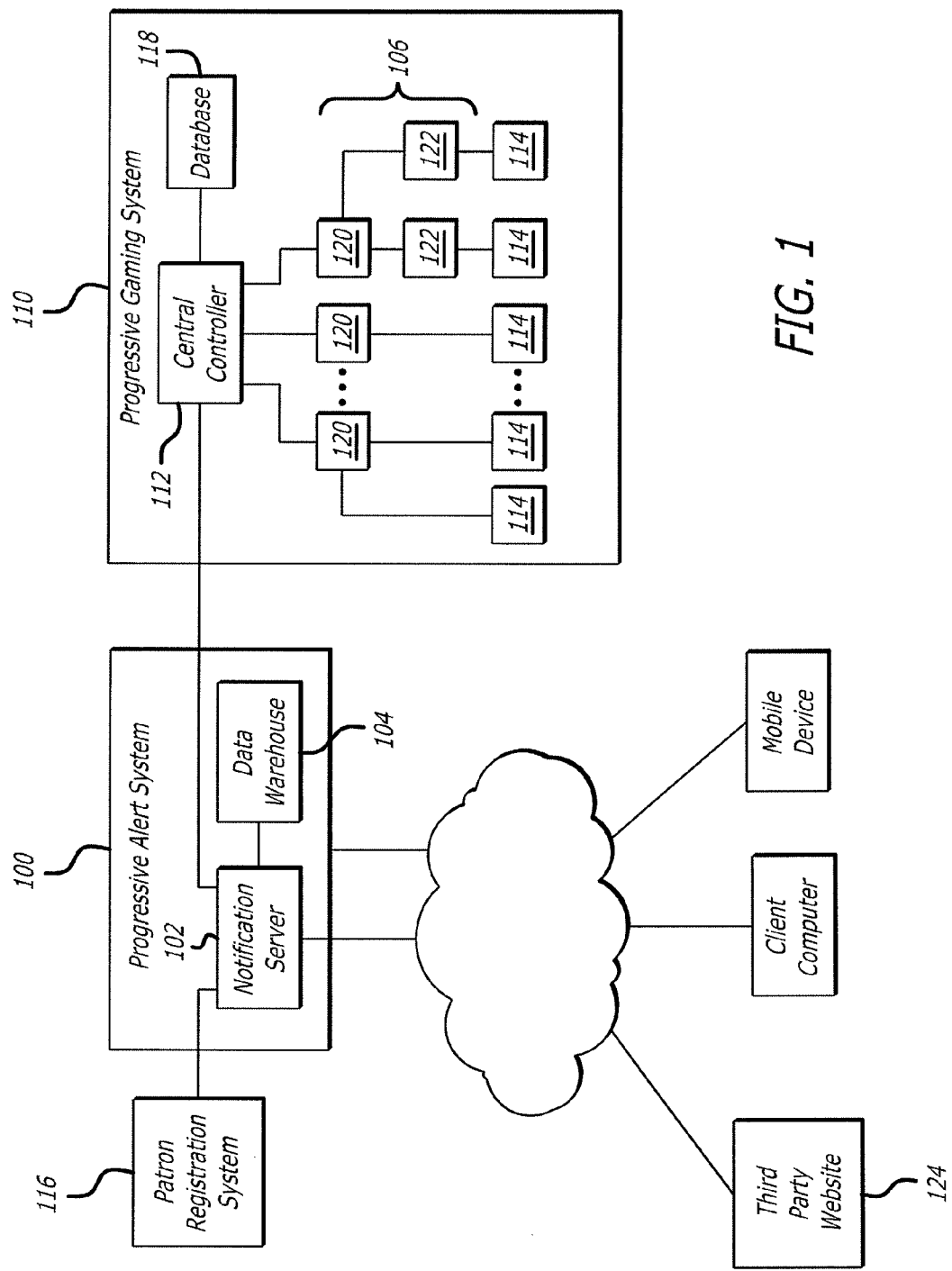
FIG. 1 is a block diagram of one embodiment of a gaming system providing progressive jackpot alerts.

Referring now to the drawings, wherein like reference numerals denote like or corresponding parts throughout the drawings and, more particularly to FIGS. 1-9B, there are shown various embodiments of a gaming system for providing a progressive level alert. More specifically, as shown in FIG. 1, the progressive alert system 100 includes a notification server/database 102 and data warehouse 104. Optionally, an archival storage is in communication with the notification server 102. The progressive alert system 100 is also in communication with one or more progressive gaming systems 110 that manage a plurality of gaming devices 114. The progressive gaming systems 110 send meter data to the progressive alert system 100. The progressive alert system 100 is also in communication with one or more patron registration system 116 including, but not limited to, an internet web portal, casino club desk, or a player tracking system associated with a gaming device. Based upon patron preferences and current jackpot levels, the progressive alert system 100 is able to disseminate a progressive jackpot alert to a registered patron or a website. For example, a text message or an email is sent to the patron's personal computer or mobile phone. The progressive alert system 100 may be connected to the Internet, mobile network, land line, or any other communications network to transmit the progressive alert to a patron or a website.

As shown in FIG. 1, each progressive gaming system 110 also includes a central controller 112 that manages the progressive jackpot. The central controller 112 is also connected to a database 118 and one or more intermediary modules 106. The intermediary modules 106 may be coupled to one or more gaming devices 114. In one embodiment, the central controller 112 is connected to one or more casino modules 120, which are connected to one or more game machine modules 122, which are connected to one or more gaming devices 114. As those skilled in the art will appreciate, the number and/or levels of intermediary modules 106 may vary depending on the progressive system configuration (i.e., none, one, or more intermediary modules).

The gaming devices 114 may present one or more games of chance having the same or different denominations. Generally, a portion of the wagers on the gaming device 114 is used to fund a progressive jackpot that is associated with a particular outcome, and the progressive jackpot is awarded when a particular game outcome is achieved on the gaming device. The longer the gaming device 114 is played before a progressive jackpot is won, the larger the progressive jackpot can grow.

The communications links between the various components within the progressive gaming system 110 may be wired, wireless, optical, microwave, infra-red, or any other suitable method for communicating information between devices. The various communication links in the progressive gaming system 110 may be serial links, Ethernet connections, MSMQ connections, or any combination thereof.

The progressive gaming system 110 may be a near area progressive, in which a group of gaming devices 114 in a single location in a casino such as a bank of gaming devices. This is often referred to as a near area progressive (NAP). In other applications, the progressive gaming system 110 is composed of gaming devices 114 that may be located within multiple casino locations and even multiple casinos. This is referred to as a wide area progressive (WAP). The progressive gaming system 110 of FIG. 1 may be a WAP as disclosed in U.S. patent application Ser. No. 11/225,703, filed Sep. 12, 2005, or U.S. patent application Ser. No. 11/539,865, filed, Oct. 9, 2006, both of which are hereby incorporated by reference in their entirety.

Figure 2:
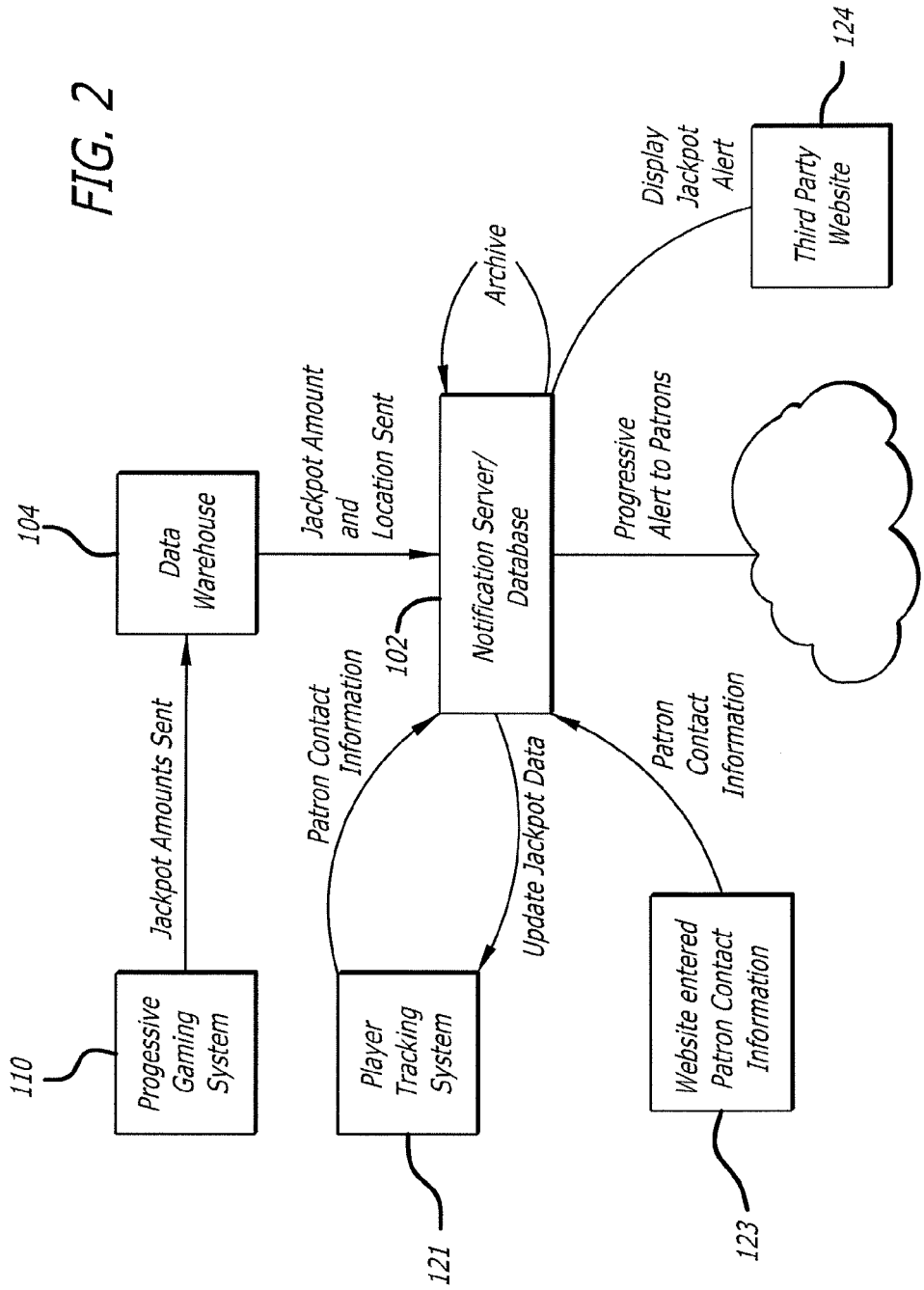
FIG. 2 is a block diagram showing the operation of a progressive alert gaming system.

FIG. 2 is an overview of the operation of one embodiment of a progressive alert system 100. As shown in FIG. 2, the system 100 manages alerts for one or more progressive jackpots. When the amount of the progressive jackpot grows to a particular amount (i.e., the meter data achieves a particular value), a jackpot notification is sent to a pre-set list of recipients via a variety of messaging methods. The notification means include, but are not limited to, email, text message, pre-recorded voice message, text-based post (e.g., a tweet on TWITTER), message on a social networking site (e.g., FACEBOOK or FOURSQUARE), or a combination thereof. A patron submits opt-in data and message type for receiving the jackpot amount notification. The patron may request a progressive jackpot alert through a player tracking device on a gaming machine, a casino web portal, at a casino players' club desk, or through the player's mobile phone or personal computer.

Figure 3:
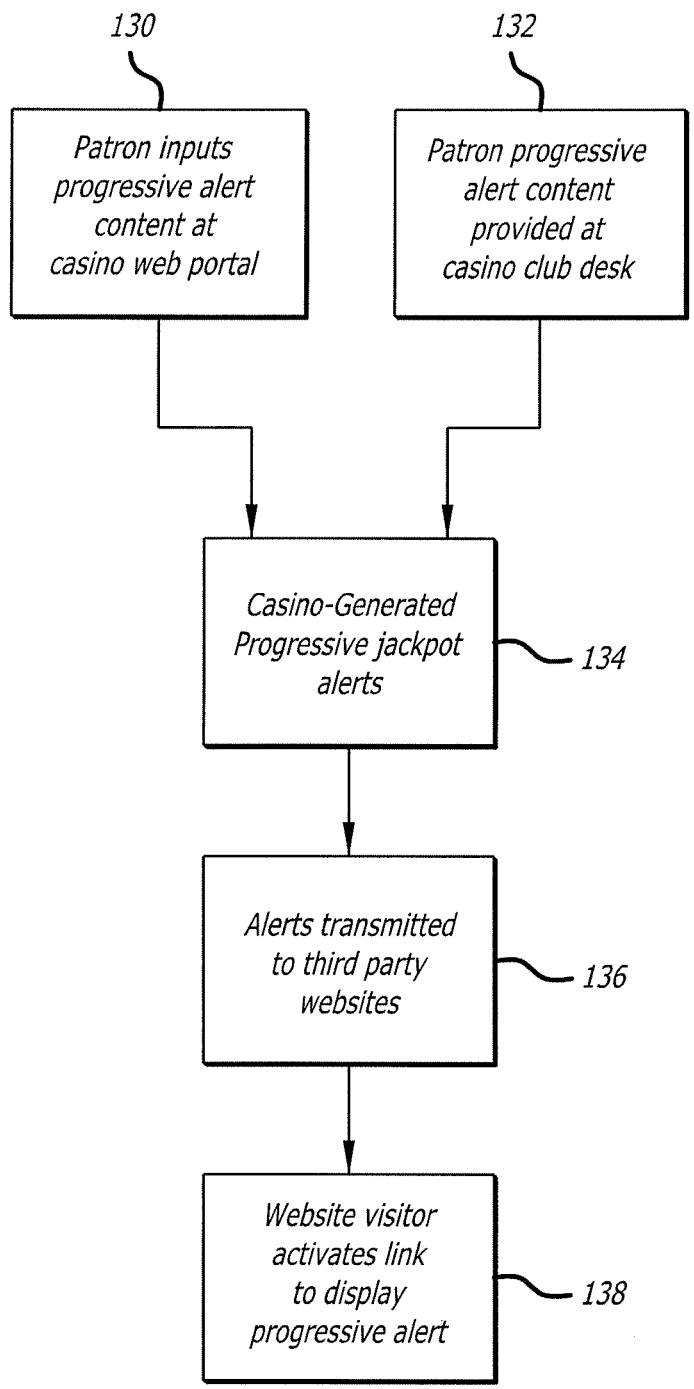
FIG. 3 illustrates a data flow diagram for one embodiment of a progressive alert gaming system.

FIG. 3 illustrates a data flow diagram for one embodiment of a progressive alert gaming system 100. The progressive gaming system 110 sends jackpot amount data to a data warehouse 104. The data warehouse 104 stores jackpot and location data. The location data may include the state, city, business (e.g., casino, airport, store, kiosk), and game. Next, the data warehouse 104 sends jackpot amount and location data to a notification server 102. The data is sent on a set schedule (e.g., hourly, daily, weekly, bi-weekly, or monthly). The player tracking system 121 sends the contact information (such as the email address and/or phone numbers) of participating individuals to the notification server 102. In one embodiment, this information is typically obtained from a player at a casino club desk. Alternatively, player information may be obtained directly from the player at the gaming device 114. The information obtained from the player includes, but is not limited to, the player's name, phone number(s), email addresses, contact preference, alert level amount, game and/or progressive preferences.

Optionally, player contact information that is entered through an affiliated website 123 is sent to the notification server 102. According to one embodiment, the player information entered via the website remains static while other information may be updated.

As shown in FIG. 2, the notification server 102 sends messages on a set schedule and when certain jackpots reach predefined levels. As shown in FIG. 2, the notification server

102 may also transmit messages to third party travel sites 124 to display jackpot levels when customers book trips to gaming locations and/or specific hotels. The messages may appear on those website pages as alerts, hyperlinks, advertisements, or any combination thereof. According to one embodiment, the notification server 102 archives the sent messages for sixty days. After sixty days, the messages are deleted. As those skilled in the art will appreciate, the messages may be kept for any number of days and may also be deleted once the message is sent. In another embodiment, reminder messages may be sent periodically. After a jackpot has been hit, new jackpot levels overwrite the old levels. Also, new player tracking information is uploaded to the notification server to reflect changes to the player tracking system.

FIG. 3 illustrates one embodiment of transmitting progressive jackpot alerts to third party websites such as, but not limited to, travel websites. As shown in FIG. 3, the casino gathers information related to the progressive alert content from a player either through a web portal or a casino club desk at steps 130 and 132, respectively. The progressive jackpot alert messages are generated by a gaming establishment for the third party website at step 134. These messages may be conditioned on various marketing matters (e.g., current promotions, special events at the casino, or the like), travel destinations, gaming venue destinations, previous travel activity, and shared travel and patron tracking data. The casino-generated alerts may then be sent to affiliated or partner travel companies for marketing use including, but not limited to, website display at step 136. In one method, the alerts are displayed on the travel company website as a hyperlink for visitors or subscribers of the website. The progressive alert message may be viewed and acted upon, typically by a click of a link to reveal progressive jackpot information at the same web page or a new web page. In one embodiment, the patron information is used to create targeted progressive alert messages to patrons via the affiliated travel website. In another embodiment, the progressive alert is a generic progressive alert to any visitor of the partner/affiliated travel company at step 138.

Figure 4:
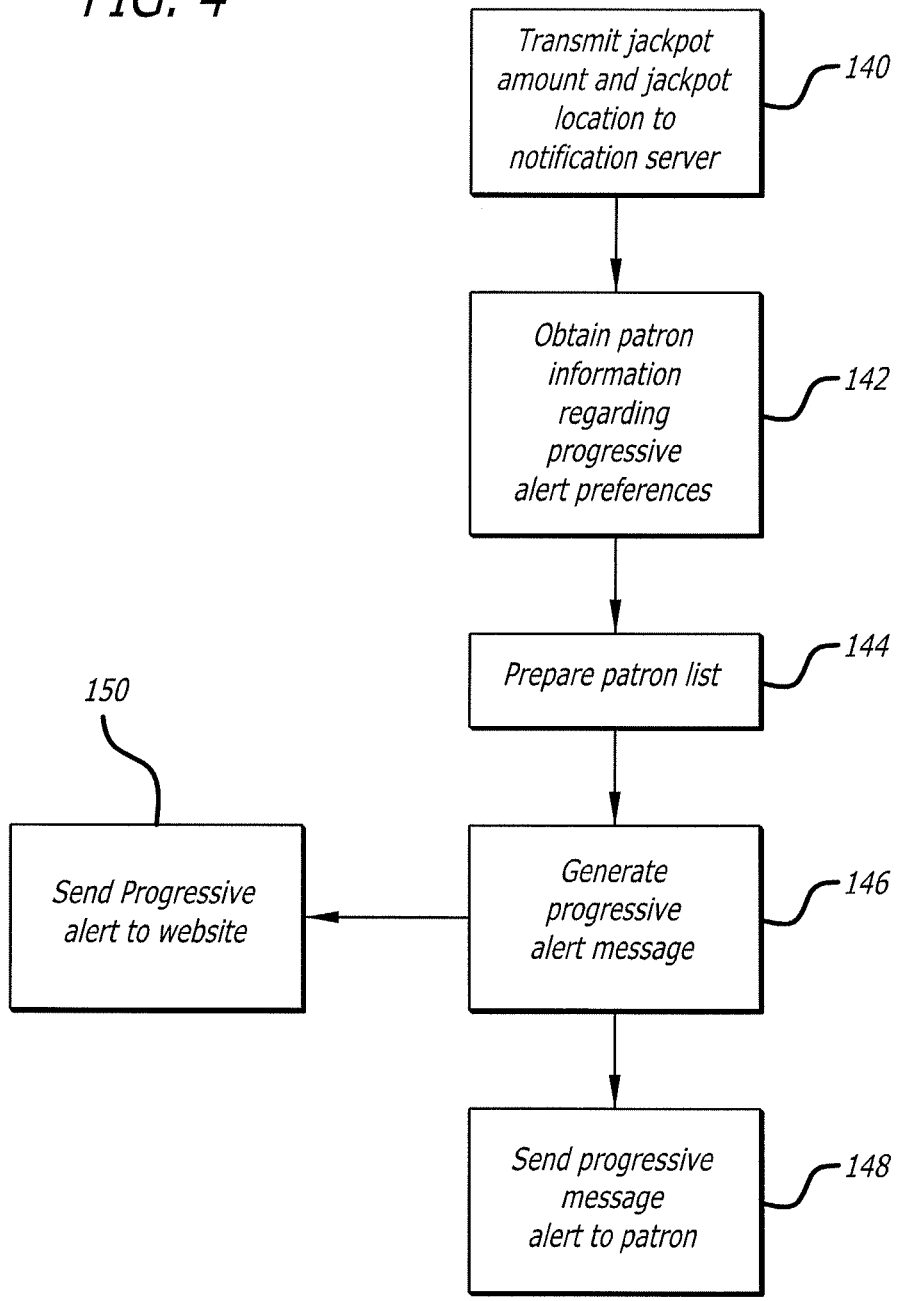
FIG. 4 illustrates another data flow diagram for one embodiment of a progressive alert gaming system.

FIG. 4 illustrates one method for issuing a progressive alert message. At step 140, the jackpot amount and locations are sent from the progressive gaming server to a notification server. At step 142, patron information is obtained through a casino club, casino web portal, or travel site affiliate. The patron information includes, but is not limited to, the patron's name, address, age, phone number, email address, mobile phone number, FACEBOOK page, TWITTER account, or other contact information. The patron information may also be obtained from a player tracking system if the player is a previously registered player. In one embodiment, the patron information is associated with an identification number.

After the patron information is entered, the system gathers the patron data details to form an administrative list at step 144. The system then processes the patron's pertinent information. Optionally, the system sends its messages through the existing communication network(s), and the messages may be authenticated by existing authorization sequences. The notification server then determines the circumstances when a progressive alert message is transmitted to a selected patron at step 146. At step 148, the message alert may be sent by one or more of the following communication means: email, automated phone message, text message, multimedia text messages, tweet, or any other form of communication known or developed in the art.

In those methods using messaging as the communication means, the message may include additional information such as, but not limited to, notification of a progressive value or a hit on a particular gaming machine; notification of any big jackpot in a gaming establishment; or notification of big bonus awards.

In another method, the notification server is able to determine the location of the patron. If the patron is located within or in close proximity to a particular progressive game, the notification server may also send a targeted, time-appropriate message regarding casino promotions, availability of the patron's preferred gaming devices, or new games available for play.

The alerts are sent to the patron immediately upon request or at timed intervals (e.g., daily). Also, the alerts are sent to the patron for specific jackpots, jackpot amounts, jackpot locations, jackpot type, or jackpot values within a requested value range. For example, if a progressive jackpot value is less then a patron specified range, then no message processing is performed. However, if the progressive jackpot value is equal to or greater than the patron specified range, then message processing occurs and a message transmitted to a patron. In one embodiment, each transmitted message identifies the recipient patron. Alternatively, the transmitted message may be sent to one or more patrons who are enrolled in a casino's player club. Optionally, the notification system may predict future messaging conditions, which will trigger one or more progressive alerts being sent to one or more patrons. After the progressive alert messages have been sent, the sent messages are archived for a period of time. Additionally, appropriate progressive jackpot data is updated.

FIG. 4 also illustrates an alternative method for issuing a progressive alert message. In this method, the notification server sends progressive alert messages to a third party website at step 150. Alternatively, the notification server may send the progressive alert message to a casino's own website or affiliated website. In another method, the notification server creates and sends a hyperlink form to the appropriate travel website(s). A visitor or registered user of the travel website may activate the hyperlink, which reveals the current progressive jackpot amount for a given progressive game. The hyperlink may also be tailored to the particular website clientele. For example, a hyperlink providing notice of a lower progressive jackpot value may be sent to a website promoting inexpensive trips to gambling destinations such as, but not limited to, Las Vegas and/or Atlantic City. Alternatively, a hyperlink providing notice of higher progressive jackpot values may be sent to websites promoting luxury trips to gambling destinations such as, but not limited to, Monaco, Las Vegas, or Atlantic City.

Figure 5:
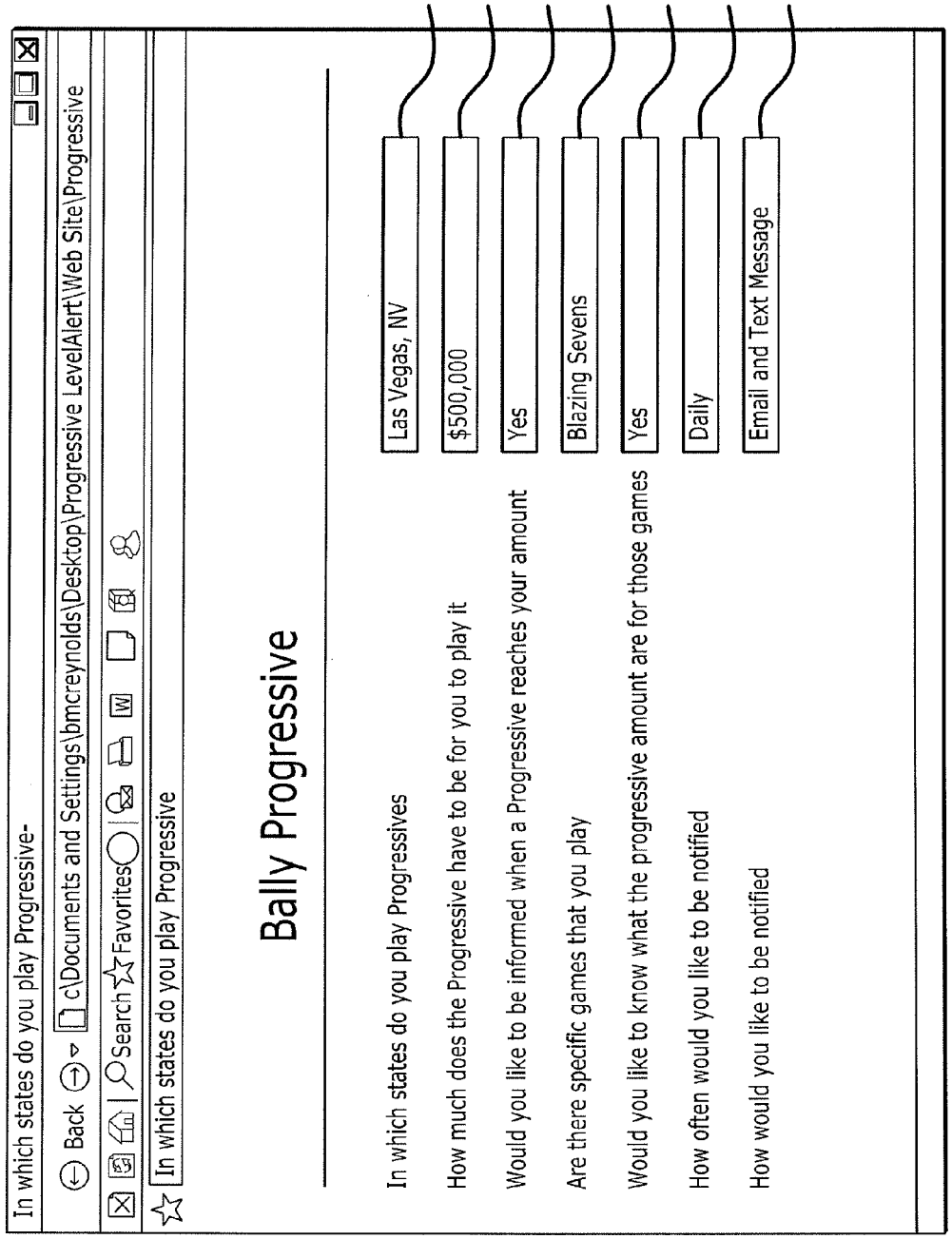
FIG. 5 is an embodiment of a user interface screen for configuring a progressive jackpot alert.

According to another method, a user interface screen 160 as shown in FIG. 5 may be presented to the player. The user may be directed to the user interface screen 160 through a hyperlink contained with a message sent to the player or the user is directly taken to the user interface screen having multiple fields 162 *a-g* for receiving player preferences. As shown in FIG. 5, the user may manually input the selections into each field query. Alternatively, the user interface may provide one or more drop down menus (not shown) having a set of responses for each field query. The information queries include: jurisdictions in which the player gambles; threshold progressive amount that will induce a player to play a game; whether the player wants to be notified when a progressive reaches a particular amount; player preferences for a base game; progressive amount for the games the user plays; frequency of progressive alerts; and method of notification of progressive alerts.

In accordance with one or more embodiments, FIG. 6 illustrates a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480 and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

The plurality of player-activated buttons 460 may be used for various functions such as, but not limited to, selecting a wager denomination, selecting a game to be played, selecting a wager amount per game, initiating a game, or cashing out money from gaming machine 400. Buttons 460 function as input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the invention, gaming machine 400 may present a video or mechanical reel slot machine, a video keno game, a lottery game, a bingo game, a Class II bingo game, a roulette game, a craps game, a blackjack game, a mechanical or video representation of a primary wheel game or the like.

Figure 6A:
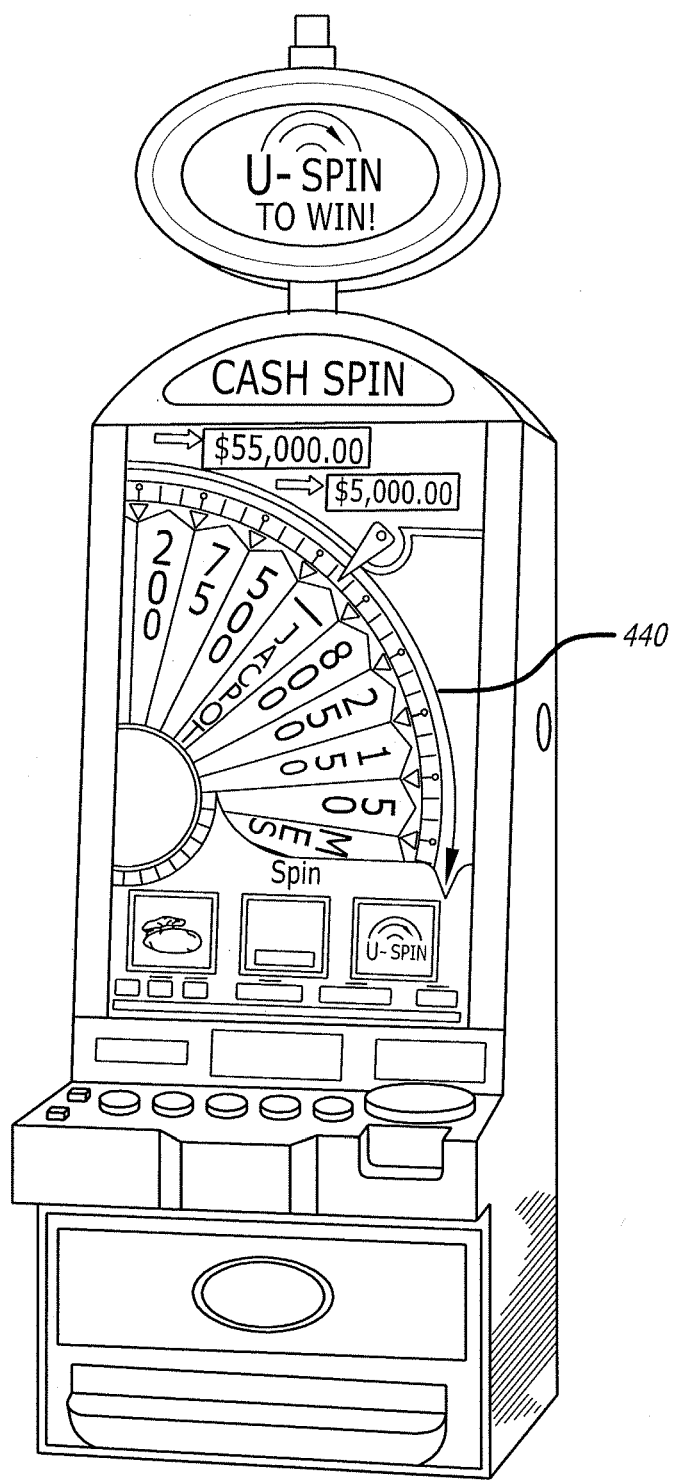
FIG. 6A is a perspective view of one embodiment of a gaming machine in accordance with one or more embodiments.

Mechanical or video/mechanical embodiments may include game displays such as mechanical reels, wheels, or dice as required to present the game to the player. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 6A illustrates an example of a portrait mode game display 440 having widescreen dimensions in accordance with one embodiment of the invention. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 440 may include transparent portions which cover and may interact with displays on mechanical reels, as described in U.S. application Ser. No. 12/113,112, entitled, "Mechanical Reels With Interactive Display," filed on Apr. 30, 2008, hereby incorporated in its entirety by reference.

Game display 440 may also present information such as, but not limited to, player information, advertisements and casino promotions, graphic displays, news and sports updates, or even offer an alternate game. This information may be generated through a host computer networked with gaming machine 400 on its own initiative or it may be obtained by request of the player using either one or more of the plurality of player-activated buttons 460; the game display itself, if game display 440 comprises a touch screen or similar technology; buttons (not shown) mounted about game display 440 which may permit selections such as those found on an ATM machine, where legends on the screen are associated with respective selecting buttons; or any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 7A:
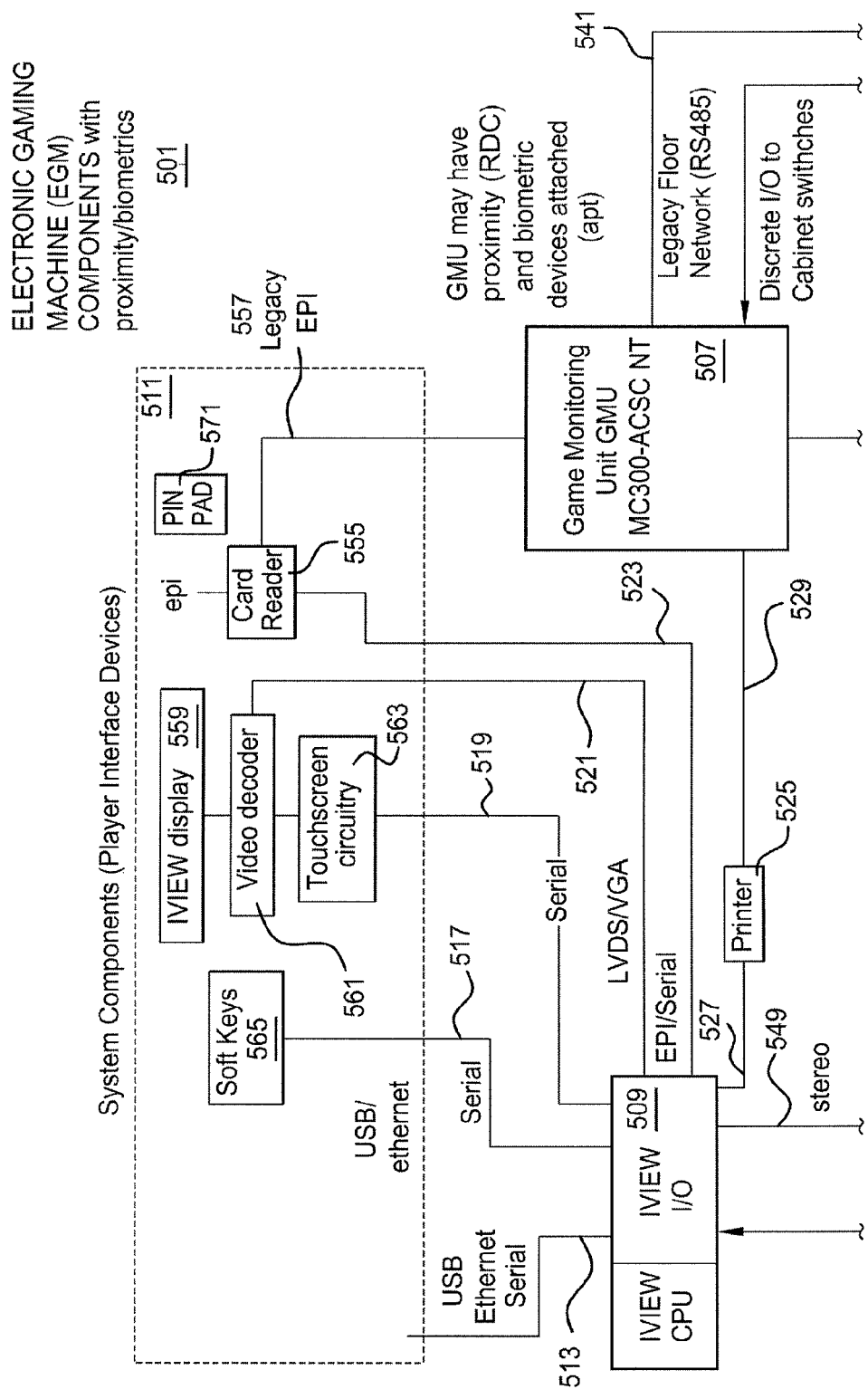
FIGS. 7A-7B are block diagrams of the physical and logical components of one embodiment of a gaming machine.
Figure 7B:
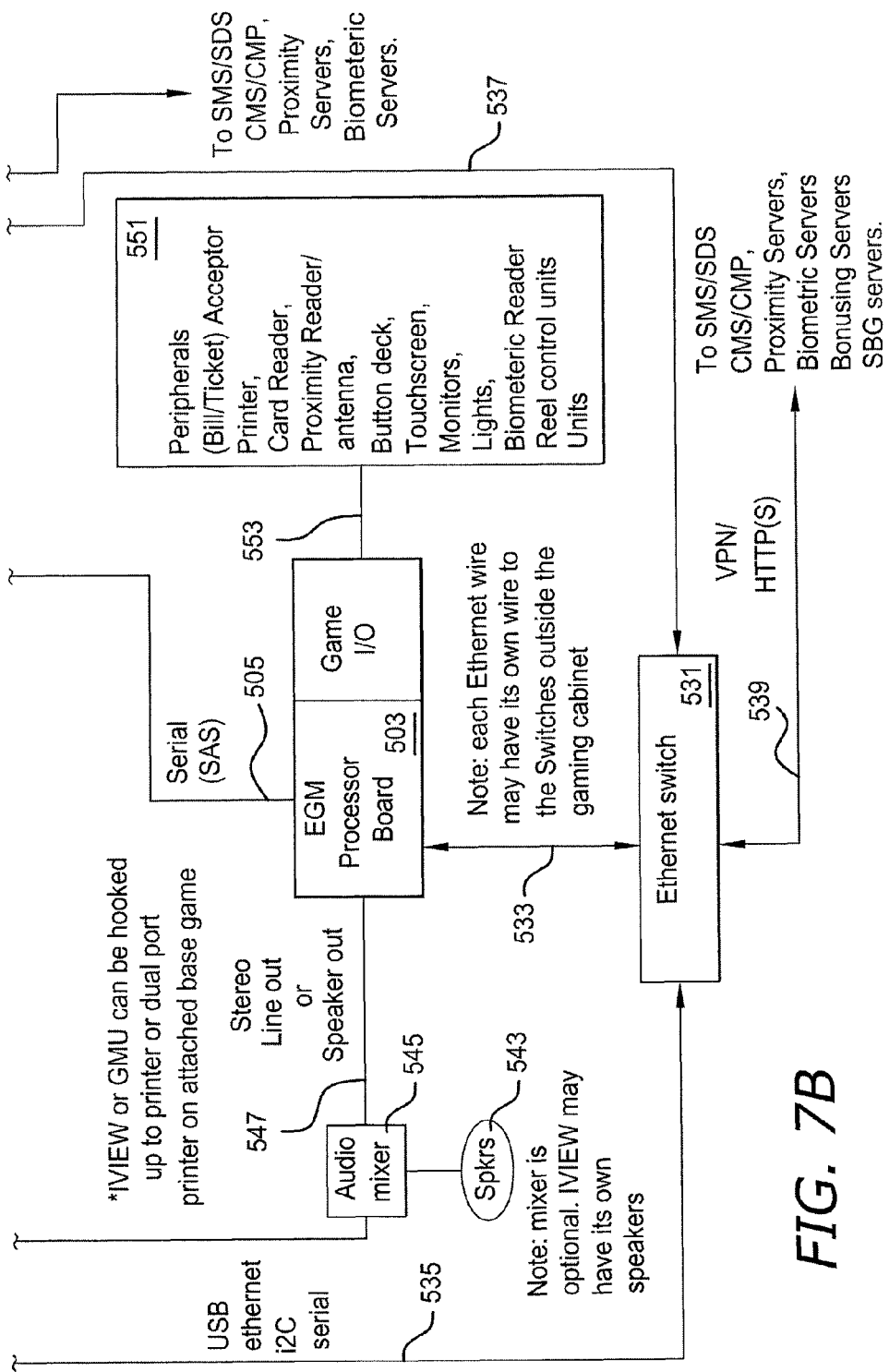

Referring to FIGS. 7A-7B, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iView unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having an interactive wheel feature game. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 400; for example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, display 559 through video decoder 561 and bus 521, such as an LVDS or VGA bus.

As part of its programming, the PID processor executes coding to drive display 559 and provide messages and information to a player. Touch screen circuitry interactively connects display 559 and video decoder 561 to PID 509, such that a player may input information and cause the information to be transmitted to PID 509 either on the player's initiative or responsive to a query by PID 509. Additionally soft keys 565 connect through bus 517 to PID 509 and operate together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iVIEW processing board and game monitoring unit (GMU) processing board. The GMU and iVIEW can combined into one like the commercially available Bally GTM iVIEW device. This device may have a video mixing technology to mix the EGM processor's video signals with the iVIEW display onto the top box monitor or any monitor on the gaming device.

Figure 8:
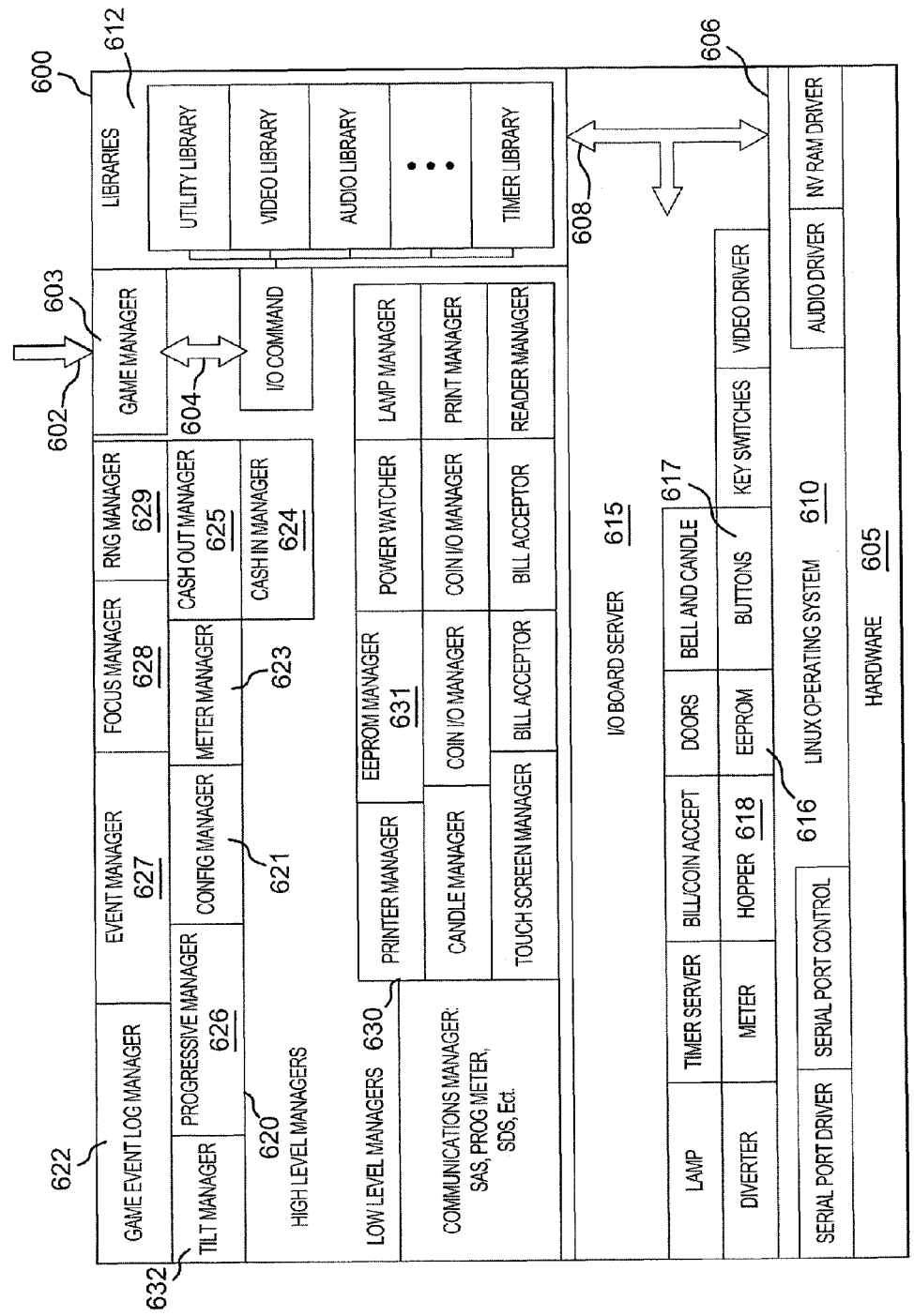
FIG. 8 is a block diagram of the logical components of a gaming kernel in accordance with one or more embodiments of the invention.

In accordance with one or more embodiments, FIG. 8 is a functional block diagram of a gaming kernel 600 of a game program under control of processor board 503, uses gaming kernel 600 by calling into application programming interface (API) 602, which is part of game manager 603. The components of game kernel 600 as shown in FIG. 8 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's (622) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash in (624) and cash out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a callback posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernal for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 9A:
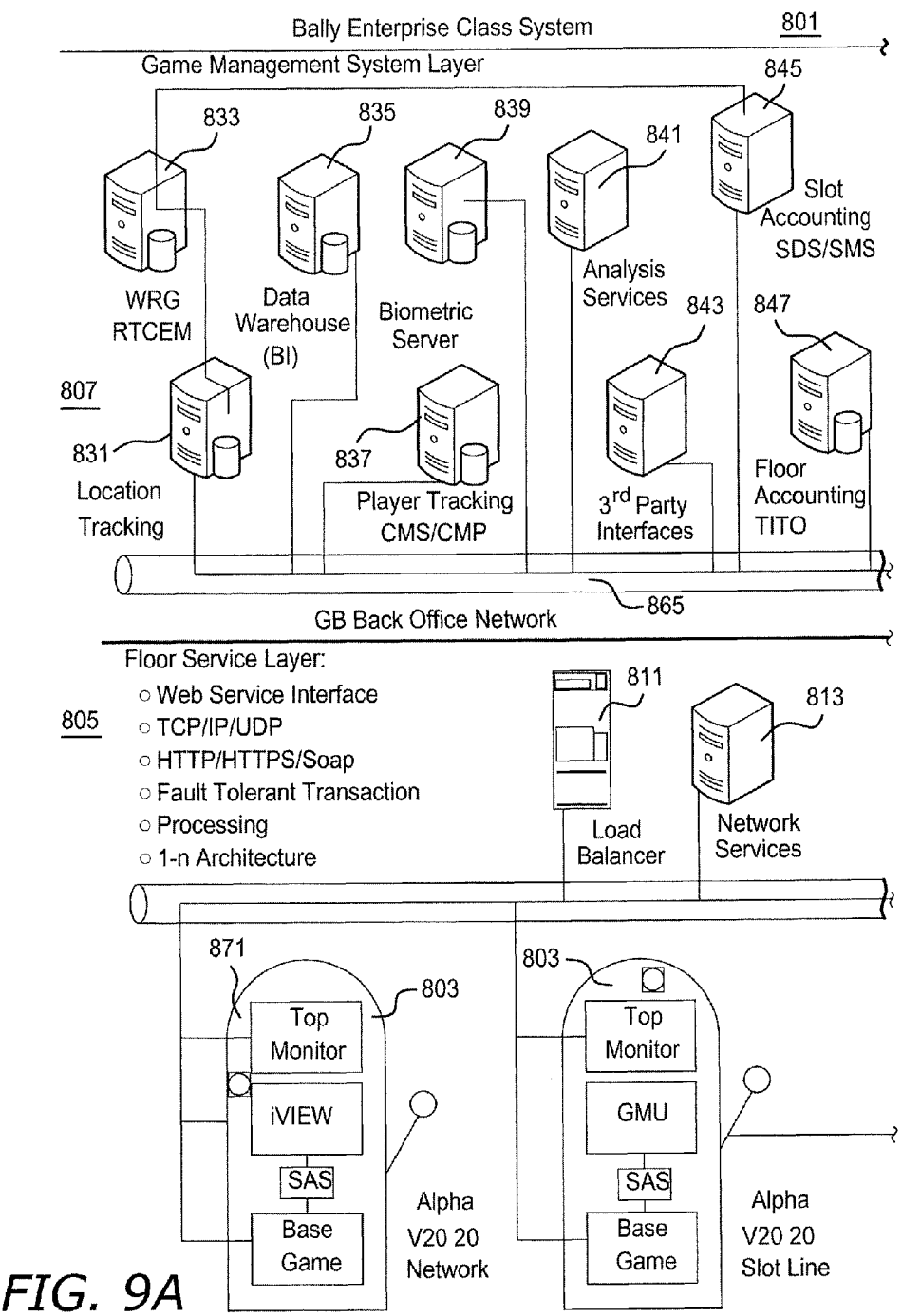
FIGS. 9A-9B are schematic block diagrams showing the hardware elements of a networked gaming system in accordance with one or more embodiments.
Figure 9B:
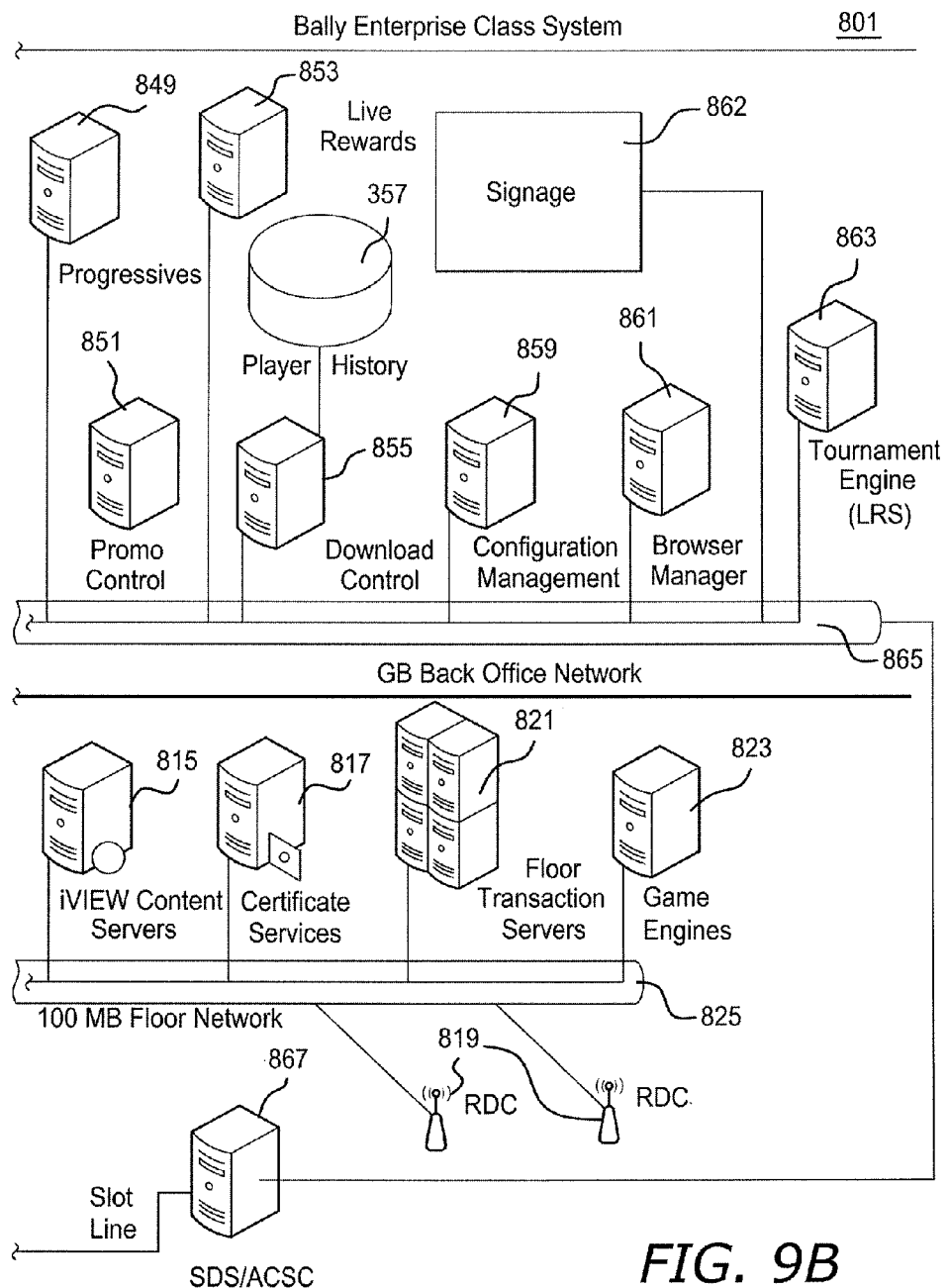

Referring to FIGS. 9A-9B, enterprise gaming system 801 is shown in accordance with one or more embodiments. Enterprise gaming system 801 may include one casino or multiple locations and generally includes a network of gaming machines 803, floor management system (SMS) 805, and casino management system (CMS) 807. SMS 805 may include load balancer 811, network services servers 813, player interface (iVIEW) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 305 servers and devices, firmware, media, operating systems, and configurations may be downloaded to the system components of respective gaming machines for upgrading or managing floor content and offerings in accordance with operator selections or automatically depending upon CMS 807 and SMS 805 master programming. The data and programming updates to gaming machines 803 are authenticated using conventional techniques prior to install on the system components.

In various embodiments, any of the gaming machines 803 may be a mechanical reel spinning slot machine, video slot machine, video poker machine, video bingo machine, keno machine, or a gaming machine offering one or more of the above described games including an interactive wheel feature. Alternately, gaming machines 803 may provide a game with an accumulation-style feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Gaming," filed on Nov. 9, 2007, which is hereby incorporated by reference in its entirety for all purposes.

It should be noted that the term gaming machine is intended to encompass any type of gaming machine, including handheld devices used as gaming machines such as cellular based devices (e.g. phones), PDAs, or the like. The gaming machine can be represented by any network node that can implement a game and is not limited to cabinet based machines. The system has equal applicability to gaming machines implemented as part of video gaming consoles or handheld or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device with these devices built in, such as a tablet type computing device, PDA, cell phone or other type of computing device capable of playing system games.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for issuing a progressive jackpot alert, the method comprising:
    providing at least one gaming device comprising:
        (i) at least one display device;
        (ii) a plurality of input devices including:
            (a) an acceptor of a first physical item associated with a first monetary value;
            (b) a cashout button actuatable to cause an initiation of a payout associated with a credit balance;
        (iii) at least one gaming device processor; and
        (iv) at least one gaming device memory device storing a plurality of gaming device programs;
    storing progressive jackpot amounts from one or more progressive gaming systems in a data warehouse;
    providing a user interface configured to receive player preferences regarding personalized progressive level alerts;
    generating one or more personalized progressive jackpot alerts by the notification server, based upon a progressive jackpot level and in accordance with player preferences received from the player before a progressive prize is awarded from a notification server, for an affiliated or third party website based on jackpot amounts stored in the data warehouse; and
    transmitting the one or more personalized progressive jackpot alerts to an affiliated or third party website for presentation on the affiliated or third party website.

2. The method of claim 1, further comprising: revealing information associated with the progressive jackpots upon activating a hyperlink in the progressive alert.

3. The method of claim 1, wherein the affiliated or third party website is a travel website.

4. The method of claim 3, further comprising: revealing information associated with the progressive jackpots upon activating a hyperlink in the progressive alert.

5. The method of claim 1, wherein the communication is an email or a text message to the player.

6. The method of claim 1, further comprising: determining whether the player is located in close proximity to a progressive jackpot; and transmitting a targeted, time-appropriate message regarding lottery games available for play.

7. A method for issuing a progressive jackpot alert, the method comprising:
    providing at least one gaming device comprising:
        (i) at least one display device;
        (ii) a plurality of input devices including:
            (a) an acceptor of a first physical item associated with a first monetary value;
            (b) a cashout button actuatable to cause an initiation of a payout associated with a credit balance;
        (iii) at least one gaming device processor; and
        (iv) at least one gaming device memory device storing a plurality of gaming device programs;
    receiving player data from a web portal, wherein the player data includes player contact information and a player-selected, threshold progressive jackpot amount for triggering a personalized progressive jackpot alert associated with at least one lottery game; and
    issuing a personalized progressive jackpot alert from a notification server, based upon a progressive jackpot level and in accordance with player preferences received from the player before a progressive prize is awarded from a notification server, to the player when a progressive jackpot satisfies the threshold progressive jackpot amount selected by the player.

8. The method of claim 7, wherein the communication is an email or a text message to the player.

9. The method of claim 7, further comprising: revealing information associated with the progressive jackpots upon activating a hyperlink in the progressive alert.

10. The method of claim 7, further comprising: determining whether the player is located in close proximity to a progressive jackpot; and transmitting a targeted, time-appropriate message regarding lottery games available for play.

11. A progressive gaming system, comprising:
  at least one gaming device comprising:
    (i) at least one display device;
    (ii) a plurality of input devices including:
      (a) an acceptor of a first physical item associated with a first monetary value;
      (b) a cashout button actuatable to cause an initiation of a payout associated with a credit balance;
    (iii) at least one gaming device processor; and
    (iv) at least one gaming device memory device storing a plurality of gaming device programs;
  a progressive server that controls a progressive jackpot associated with a lottery game;
  a data warehouse coupled to the progressive gaming system, wherein the data warehouse contains jackpot amount data;
  a user interface configured to receive player preferences regarding personalized progressive level alerts; and
  a notification server in communication with the data warehouse, wherein the notification server issues a personalized progressive jackpot alert, based upon the progressive jackpot level and in accordance with player preferences received from the player before a progressive prize is awarded, to at least one player when the progressive jackpot reaches a predetermined amount.

12. The progressive gaming system of claim 11, further comprising a player tracking system in communication with the notification server, wherein the player tracking system provides player data regarding the at least one player requesting the progressive level alert.

13. The progressive gaming system of claim 11, further comprising a web portal for receiving player information and a player request for the progressive level alert.

14. The progressive gaming system of claim 11, further comprising an affiliated third party website in communication with the notification server, wherein the affiliated third party website receives and presents a progressive level alert.

\* \* \* \* \*